United States Patent [19]

Morganti et al.

[11] Patent Number: 4,703,417
[45] Date of Patent: Oct. 27, 1987

[54] CALL INSTRUCTION FOR RING CROSSING ARCHITECTURE

[75] Inventors: Victor M. Morganti, Lincoln; Patrick E. Prange, Brookline, both of Mass.

[73] Assignee: Honeywell Information Systems Inc., Waltham, Mass.

[21] Appl. No.: 749,245

[22] Filed: Jun. 27, 1985

[51] Int. Cl.[4] .................................................. G06F 9/06
[52] U.S. Cl. ...................................................... 364/200
[58] Field of Search ... 364/200 MS File, 900 MS File

[56] References Cited

U.S. PATENT DOCUMENTS 4,297,743 10/1981 Appell et al. .................... 364/200
4,525,780 6/1985 Bratt et al. ........................ 364/200

Primary Examiner—Archie E. Williams, Jr.
Assistant Examiner—Michael J. Ure
Attorney, Agent, or Firm—Nicholas Prasinos; John S. Solakian

[57] ABSTRACT

In combination with a multiprocessing/multiprogramming computer system having a ring protection mechanism for protecting computer programs from unauthorized access, a new call instruction architecture is implemented partly in firmware and partly in hardware. Also, a new stack mechanism stores hardware managed control information in a control frame and software controlled data in a data frame.

2 Claims, 14 Drawing Figures

CALL INSTRUCTION FOR RING CROSSING ARCHITECTURE

RELATED APPLICATIONS AND PATENTS

The following United States patent applications and/or patents are related documents to the instant application:

1. Multiprocessors on a Single Semiconductor Chip by Thomas F. Joyce, Richard P. Kelly, Jian-Kus Shen and Michelm Raquin, having U.S. Ser. No. 722,237 and filed on Apr. 11, 1985.
2. Ring Checking Hardware by Pravinsinh L. Palmer, Richard P. Wilder, Ming H. Louie, and Benjamin S. Franklin, having U.S. Pat. No. 3,916,385, issued Oct. 28, 1975.
3. Protection of Data in an Information Multiprocessing System by Implementing a Concept of Rings to Represent the Different Levels of Privileges Among Processors by Marc Appell, George Lepicard, Philippe Shubert deRivet, John J. Bradley, and Benjamin S. Franklin, having U.S. Pat. No. 4,177,510, issued Dec. 4, 1979.
4. Call and Stack Mechanism for Procedures Executing in Different Rings by Marc Appell, Jean Louis Bogaert, Claude Massuard, John Bradley and Benjamin S. Franklin, having U.S. Pat. No. 4,297,743.
5. P and V Instructions for Semaphore Architecture, invented by Prange et al, assigned to the same assignee named herein, having U.S. Ser. No. 749,244, filed June 27, 1985.

BACKGROUND OF THE INVENTION

1. Field of the Invention

This invention relates generally to data processing systems, and more particularly to a method and apparatus for protecting information.

2. Description of the Prior Art

Computer systems have grown from the simple batched systems, wherein the valuable resource of random access memory was allocated to a single program, to the present-day multiprogramming multiprocessing systems wherein information is shared among a community of users. In this type of shared environment, protection of shared information is required not only to maintain user security and privacy and restrict access of information to those users entitled to it, but to guarantee system integrity and reliability by limiting the propagation of errors through intentional or unintentional altering of shared information. Several schemes have been utilized in the past in order to protect information. Some of them are detailed by Robert M. Graham in a paper entitled "Protection in an Information Processing Utility", published in CACM (May 1968).

Key to the protection of information has been to restrict access to procedures that can execute on a processor to those entities having the right to use those procedures. One such concept groups the sets of procedures into rings that can unambiguously be ordered by increasing the power or level of privilege. By assigning a collection of sets of procedures to a collection of concentric rings, and assigning numbers to each ring with the smallest ring having the smallest number, and each succeeding larger ring having a progressively greater number, different levels of privilege can be unambiguously assigned to the user of a segment of a computer system. Under this concept, the innermost ring having the smallest number assigned to it has the greatest privilege. Hence it can be postulated that users in the lowest ring number can access information having higher ring numbers, but users in the higher ring number cannot access information having lower ring numbers or can access information in the lower ring number only in a specified manner. The ring concept of information protection was used by the MULTICS operating system (Multiplexed Information and Computing Service) and was implemented in Honeywell's 635 and 645 computers. The MULTICS philosoply utilizes 64 rings of protection numbered as rings 0–63. It is described in Chapter 4 of a book entitled "The MULTICS System: An Examination of its Structure" by Elliott I. Organick, published by MIT Press, and also by the MULTICS System Programmer's Manual, 1969, MIT Project Mack. Briefly, the MULTICS system does not utilize a pure ring protection strategy, but rather employs the ring bracket protection strategy, wherein a user's access rights with respect to a given segment are encoded in access-mode and a triple ring number (R1, R2, R3), called the user's ring brackets for a given segment. This technique is implemented wholly in software. Because the MULTICS and Honeywell's 645 version of ring protection was implemented mainly in software, considerable operating system supervisor overhead was entailed, particularly when calls to greater or lesser power were made by trapping to a supervisor procedure. This made the system relatively slow. Accordingly later versions implemented the ring protection concept in hardware. In one such system data and procedure segments were grouped into a hierarchy of four rings or classes. The four rings of privilege levels are identified by entities 0–3, each ring represents a level of privilege in the system with level 0 having the most privilege and level 3 having the least. Level 0 is known as the innermost ring and level 3 is the outer ring. The basic notion is that a procedure belonging to an inner ring has free access to data in an outer ring. Conversely a procedure in an outer ring cannot access data in an inner ring without incurring a protection violation exception. Transfer of control among procedures is monitored by a protection mechanism, such that a procedure executing in an outer ring cannot directly branch to a procedure in an inner ring. This type of control transfer is possible by the execution of a special call instruction. To gain speed the instruction was implemented mainly in hardware or firmware. In order to protect this instruction against misuse certain conventions were set up. This has the disadvantage of inflexibility in calling procedures. Since the call instruction is designed to be wholly in firmware or hardware, the rules of procedure must be adhered to even though the system architecture evolves into a type not contemplated by the designer.

What was needed was a call instruction for calling procedures that had the flexibility of the MULTICS system to change algorithms just by changing the software programs, and the speed and efficiency of the hardware/firmware protection means that will meet the criteria of functional capability, economy, simplicity in programming generality.

OBJECTS

It is an object of the instant invention to provide an improved call instruction for a ring protection mechanism.

It is another object of the invention to provide an improved procedure call instruction for ring protection hardware which is fast, yet flexible.

It is still a further object of the invention to provide a call instruction which is implemented partly in firmware and partly in software.

It is yet another object of the invention to provide an improved stack mechanism for storing control information managed by the hardware, as well as data managed by the software.

These and other objects of the invention will become apparent from the description of a preferred embodiment of the invention, when read in conjunction with the drawings contained herewith.

SUMMARY OF THE INVENTION

The foregoing objects of the invention are achieved by providing a call instruction for calling procedures in the ring protection architecture which is implemented partly in firmware and partly in software. It also includes a new stack mechanism for storing hardware managed control information in a control frame and software controlled data in a data frame. Prior art devices required separate save areas apart from the stack mechanism.

The call and return instructions are intended to provide a formal and secure way for procedures to call each other; and when needed, to alter the execute privilege of a process.

The normal way of changing the ring of execution of a process is via a call to a gate having a lower-numbered ring (more privilege) and subsequent outward return. An inward call represents the invocation of a user-provided protected subsystem or a supervisor procedure. An outward return represents a return to the calling procedure.

A main function of the call instruction is also to allow the calling procedure (CGP) to pass parameters to the called procedure (CDP). This is done basically by acquiring a call frame in an appropriate stack segment and then loading this frame with the call context. A register is then loaded with a pointer to the call frame base.

BRIEF DESCRIPTION OF THE DRAWINGS

The novel features which are characteristic of the invention are set forth with particularity in the appended claims. The invention itself, however, both as to organization and operation together with further objects and advantages thereof may best be understood by reference to the following description in conjunction with the drawings in which:

DESCRIPTION OF A PREFERRED EMBODIMENT

General Discussion

The invention operates typically in a hardware system environment which is disclosed in U.S. Pat. No. 4,297,743, issued Oct. 27, 1981, and entitled "Call and Stack Mechanism for Procedures Executing in Different Rings". However the environment is modified and enhanced by the invention which utilizes a call instruction and a new stack structure which supports both control as well as data storage. Under the prior art, as noted in colum 38, lines 13-15 of the above-cited U.S. Pat. No. 4,297,743, "the procedure call is effected by hardware/firmware instructions and the hardware recognizable mechanism called the stack."

The invention has control storage support which is managed by the hardware. A control frame is acquired by the hardware whenever executing a CALL INSTRUCTION or processing a trap. This frame becomes the current frame and a base register is loaded with a pointer to the base of the current frame. The new stack mechanism NS has data storage support which is managed by the software. Whenever entering a procedure, a frame is acquired and control information (for example, the return address of the caller) is stored in the frame. The called procedure can then elect to grow the frame if it needs data storage. Upon executing a return the controlled information is used to identify the caller, and once the return is accomplished, the entire frame is released. Thus, a frame always contains control information while the data storage may, or may not, be present.

DETAILS OF A PREFERED EMBODIMENT

Figure 1:
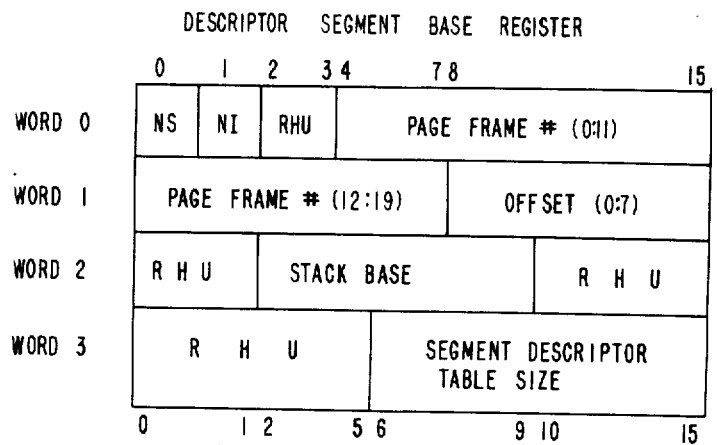
FIG. 1 shows the format of a descriptor segment base register.

Referring now to FIG. 1 there is shown the Descriptor Segment Base Register.

WORD 0

Bit 0 is the New Stack Indicator (NS). If this bit is set to 1, then the new call and return instructions are allowed and they will cause a frame to be acquired/relinquished in the appropriate stack segment of the new stack. If this bit is set to 0, then the new call and return instructions are not allowed and traps will be processed using trap save areas rather than the new stack.

Bit 1 is a new I/O indicator (NI). If this bit is set to 1, execution of I/O instructions requires new I/O handling.

Bits 2 and 3 are reserved for hardware use (RHU).

Bits 4-15 form the high order 12 bits of a 20 bit physical page frame address of a descriptor segment page table. The numerals (0:11) indicate that only bits 0-11 of the page frame number is in bit positions 4-15 of word 0.

WORD 1

Bits 0-7 form the low order 8 bits of the 20-bit physical page frame address of the descriptor segment page table (DSPT). The numbers (12:19) indicate that only bits 12 through 19 of the page frame number are to be found in bits 0-7 of word 1.

Bits 8-15 is an Offset Address that allows a page table to start on a modulo 4 word boundary. The numbers (0:11) indicate that only 8 bits of the offset are in bit positions 8 through 10 of word 1.

WORD 2

Bits 0–1 are reserved for hardware use (RHU).

Bits 2–9 form a Stack Base Address. This 8-bit field and the 2-bit R current define the segment number of the current stack segment when using the new stack mechanism NS.

WORD 3

Bits 0–5 are reserved for hardware use (RHU).

Bits 6–15 is a Segment Descriptor Table Size. This field contains a 10-bit size field. If a virtual address (VA) is greater than the segment descriptor table size, then a segment trap results.

Figure 2:
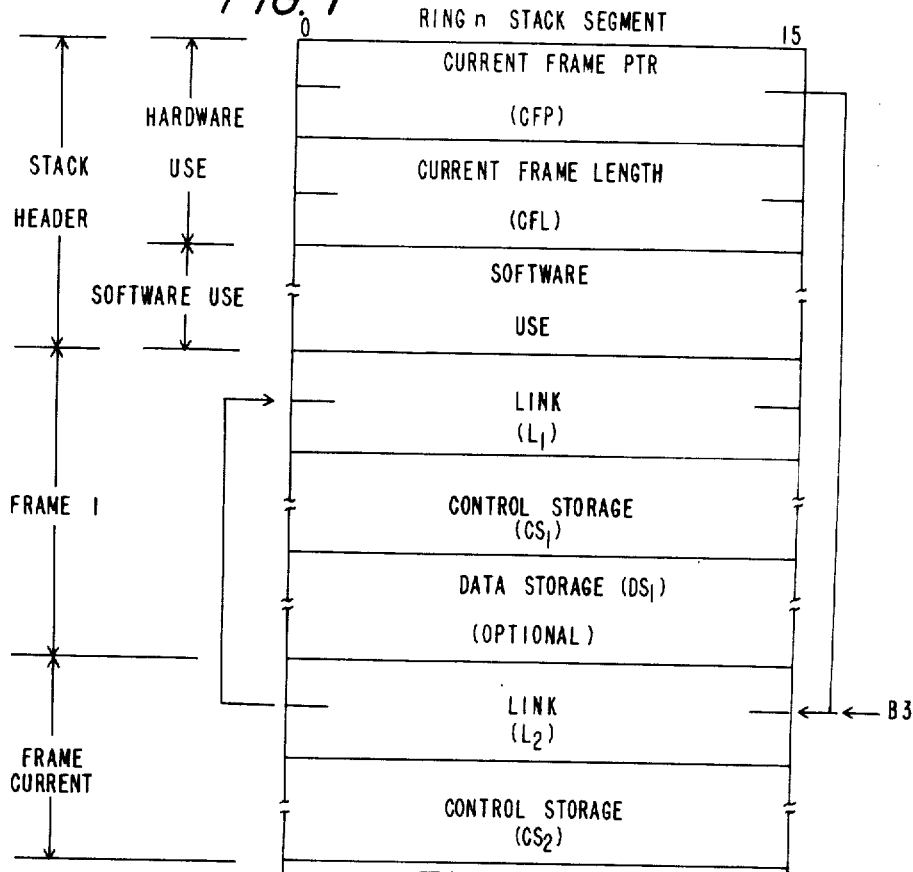
FIG. 2 shows one typical format of a stack segment.
Figures 3A, 3B:
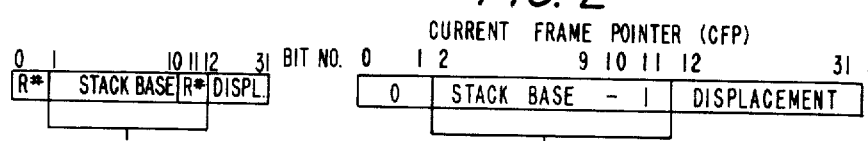
FIG. 3A is the format of a current frame pointer utilized in addressing a frame of a wired stack segment.
FIG. 3B is the format of a current frame pointer utilized in addressing a frame of a non-wired stack segment.

Referring now to FIG. 2 there is shown a typical ring n stack segment. It should be noted that the stack segment is divided into a stack header, which is further subdivided into the portion of the stack segment which is for hardware use and the portion which is for software use. A portion of the stack segment for hardware use stores a current frame pointer (CFP) and a current frame length (CFL). The current frame pointer CFP is shown in FIGS. 3A and 3B. FIG. 3A is for the segment number of the wired stack segment which is one less than the segment number for the non-wired stack segment. FIG. 3B is for the segment number or the non-wired stack segment.

Referring to FIG. 3A, bits 0–1 store the ring number of the wired stack. (Note that since this is the wired stack segment the value will always be 0.) Bits 2–9 store a stack base address which indicates the base where a particular stack is located. Bits 12–31 indicate the displacement from the stack base where the current frame is located. (The current frame length CFL is a 32-bit unsigned integer whose value is less than $2^{20}$; in the non-wired version the integer would be $2^{30}$.) Referring to FIG. 3B, bits 0–1 stores a stack base address which will be used as the ring number by the hardware. The stack base is in bits 1–10 whereas the ring number of bits 0–1 is also in bits 10–11 where it will be concatenated to the stack base to arrive at the segment number or the stack segment of that particular ring. The displacement in bits 12–31 is the same as in FIG. 3A.

Frame 1 of the ring n stack segment is divided into the link $L_1$, control storage $CS_1$ and data storage $DS_1$. The link is a pointer to the previous stack frame; e.g., $L_2$ of Frame Current points to $L_1$ of Frame 1. The control storage area $CS_1$ stores control information, such as for example, the return address of the calling procedure. The data storage area $DS_1$ is optional and is utilized to store data that may be required by the calling procedure.

The Frame Current is the current frame being utilized by the called procedure and is divided into a link $L_2$ and control storage $CS_2$. The control storage performs the same function of any frame which stores control information.

It should be noted that the NS is a per-process stack to ensure isolation and thus protection among processes. Furthermore it is consistent with the concept of ring protection. Specifically the stack is subdivided into compartments in order to ensure that procedures may access only those compartments for which they are authorized. Since the virtual memory (VM) implementation defines the segment to be the unit of protection, the compartments referred to above are actually segments. It should be further noted that the NS also supports the concept of wired and non-wired stack segments. (A wired stack is always present in main memory; therefore when it is referenced no page fault will ever occur. A non-wired stack resides in virtual memory, and on a given reference a part of it may not be in main memory.)

This is required because the procedures of a process actually consist of user and operating system (OS) procedures. Some of the OS procedures cannot tolerate page faults. They must use a wired stack segment. All other procedures will use the non-wired stack segments. Thus, the NS is actually a stack that consists of a wired ring 0 stack segment and up to 4 consecutive non-wired ring stack segments (1 per ring) and supports both control as well as data storage.

Figure 5:
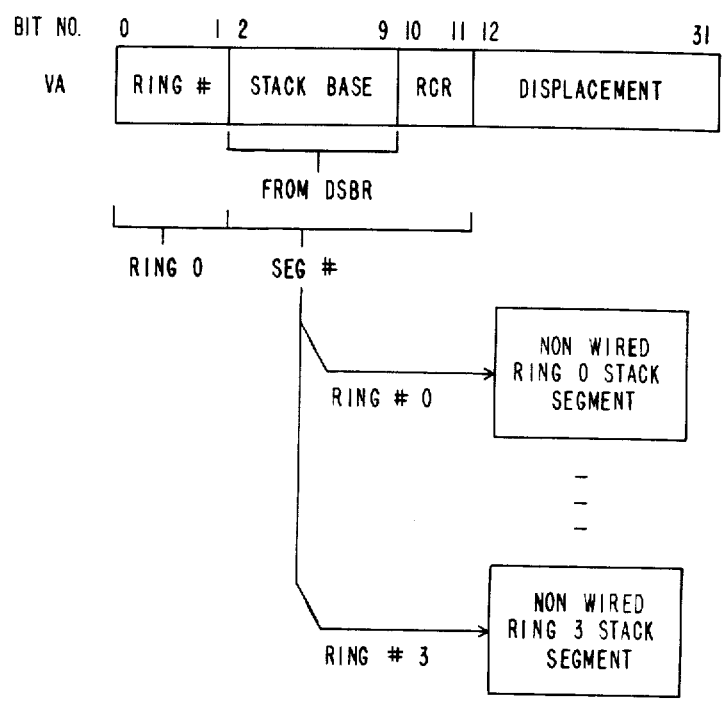
FIGS. 4 and 5 diagrammatically show the addressing of wired and non-wired stack segments, respectively.
Figure 4:
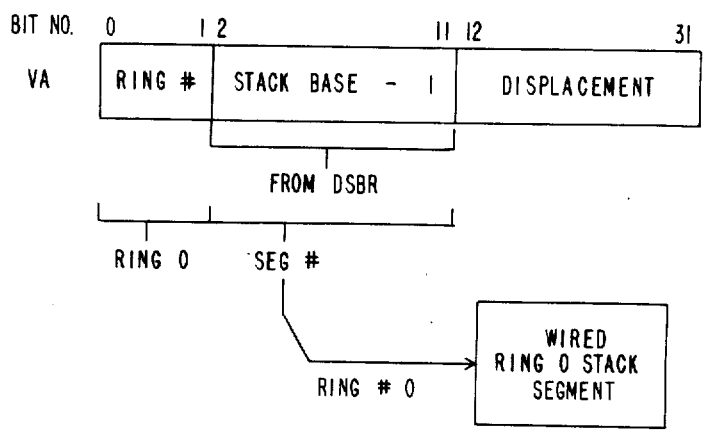

Referring now to FIGS. 4 and 5, there is shown the format of addressing the wired ring 0 stack segment and the non-wired stack segments for rings 0 through 3. The stack base address of the wired ring 0 stack segment is obtained from Word 2 of the descriptor segment base register shown in FIG. 1 and stored (minus 1) in bits 2–11 of the current frame pointer as shown in FIG. 4. Since the frame pointer is generated by the hardware, the ring number stored in bits 0–1 is 0. Utilizing the segment number and the ring number, the wired ring 0 stack segment can be located. Finally the displacement address stored in bits 12–31 indicates the address of the stack in the ring 0 stack segment acquired.

FIG. 5 shows the format for addressing the non-wired stack segments for rings 0 to 3. It is similar to the format for FIG. 4 except that the segment number is obtained from the stack base address stored in bits 2–9 and from the Ring Current RCR stored in bits 10–11.

Figure 6:
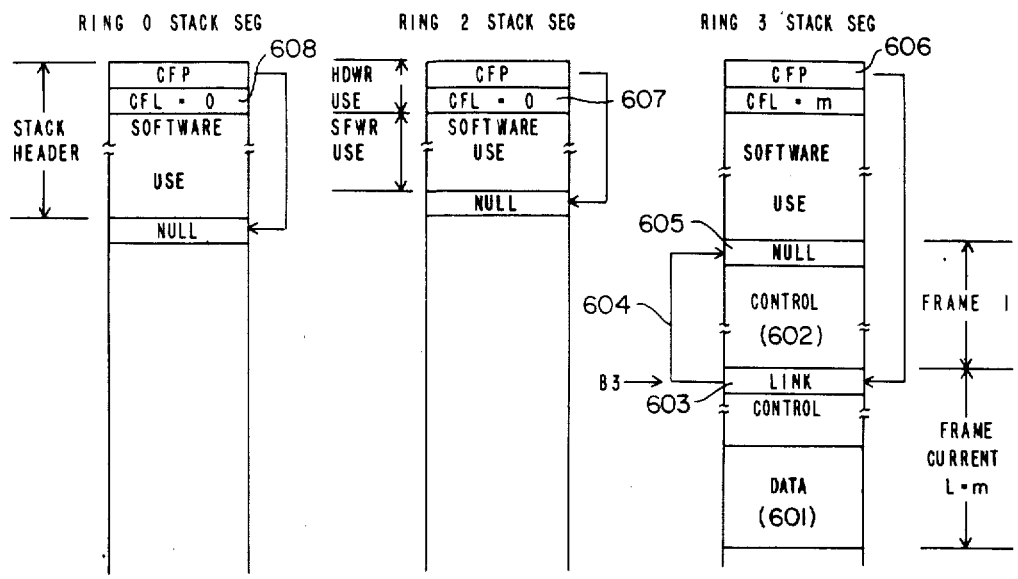
FIG. 6 diagrammatically shows the state of stack segments for a process executing in ring 3.
Figure 7:
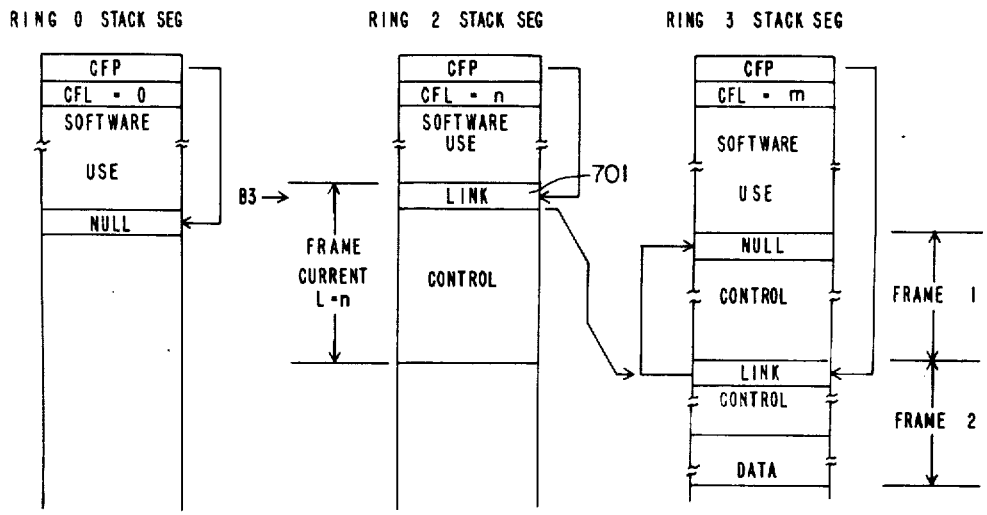
FIG. 7 shows the state of stack segments after a procedure in ring 3 makes a call to a procedure in ring 2.

Referring now to FIGS. 6 and 7 there is shown the state of three of the non-wired stack segments following initialization by the software and how they are managed by the hardware as a result of the call instruction.

FIG. 6 shows the state of the stacks for a process currently executing in ring 3 which uses the stack frame called Frame Current 601 for its control and data information. It has been called from another procedure also operating in ring 3 with its stack frame indicated as Frame 1 602. Base Register 3 points to Frame Current link 603, which in turn contains a pointer 604 to the link word of the previous frame 605. This chain of links from the current frame backwards allows the chain of procedure calls by which the current procedure was reached, to be traversed in the return direction when the current procedure is completed. The current frame pointer 606 in the ring 3 stack segment provides a pointer to the link word for the topmost frame in that particular stack so that filmware can find this top frame any time it needs it. The ring 0 stack segment, and ring 2 stack segment in FIG. 6 are both empty as noted by their current frame lengths being 0 in boxes 607 and 608. This will be normally the case for any procedure executing in the outer ring. Note that an empty stack segment may contain process state information in the software use area of the stack header. Process state information of long persistence, potentially for the life of the process, is expected to reside here.

FIG. 7 shows the state of the stacks a short time later after the procedure which was using the frame current in FIG. 6 has made a call to another procedure to be executed in ring 2. The stack frame that had been labelled Frame Current in FIG. 6 is now shown as frame 2 for the ring 3 stack segment in FIG. 7. Frame Current has moved over into the ring 2 stack segment because a new procedure is executing and it has been invoked to run in ring 2. The link field for this frame 701 points back to the stack frame of the caller; i.e., to frame 2 of the ring 3 stack segment. Only control information is shown for the Frame Current in the ring 2 stack segment since the called procedure has not acquired any data storage.

Referring now to FIGS. 8-12, the logic of the call instruction is shown via flowcharts. This logic is implemented in firmware. The call instruction is utilized to specify a transfer of control from a calling procedure (CGP) to the called procedure (CDP). An effective address (EA) defines the CDP and its entry point. An R effective (REF) defines the effective execute privilege of the CGP.

Figure 8:
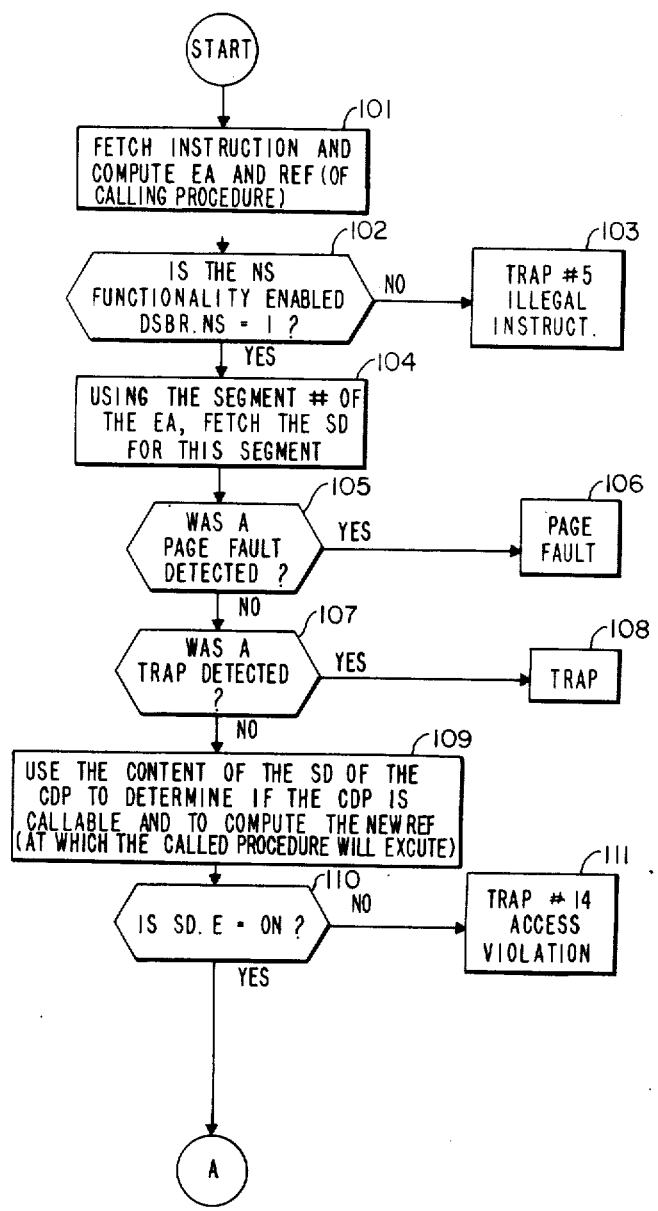
FIGS. 8-13 are flowcharts of the steps of a call instruction.

Referring to FIG. 8, the call instruction is fetched and REF of the calling procedure is computed. See block 101. This determines the procedure to be called and the entry point of the procedure. The next step 102 determines whether or not the new stack functionality (NS) is enabled. If it is not enabled, the instruction is illegal and is trapped as shown in box 103. If NS in enabled, the segment number specified in the effective address is utilized to fetch a segment descriptor for the segment which contains the procedure to be called during step 104. Then in steps 105 and 107, checks are performed to ensure that no page faults or traps occur while performing this function. If no faults or traps are detected, the segment descriptor (SD) which was fetched in step 104 is utilized to determine if the called procedure (CDP) is indeed callable and to compute the new ring effective number (REF) in which the called procedure will execute See step 109. In step 110 there is a check that determines whether the execute bit of the called segment (Procedure) is ON. If it is not ON a trap 111 is posted. If ON, go to the next step 201 in FIG. 9.

Figure 9:
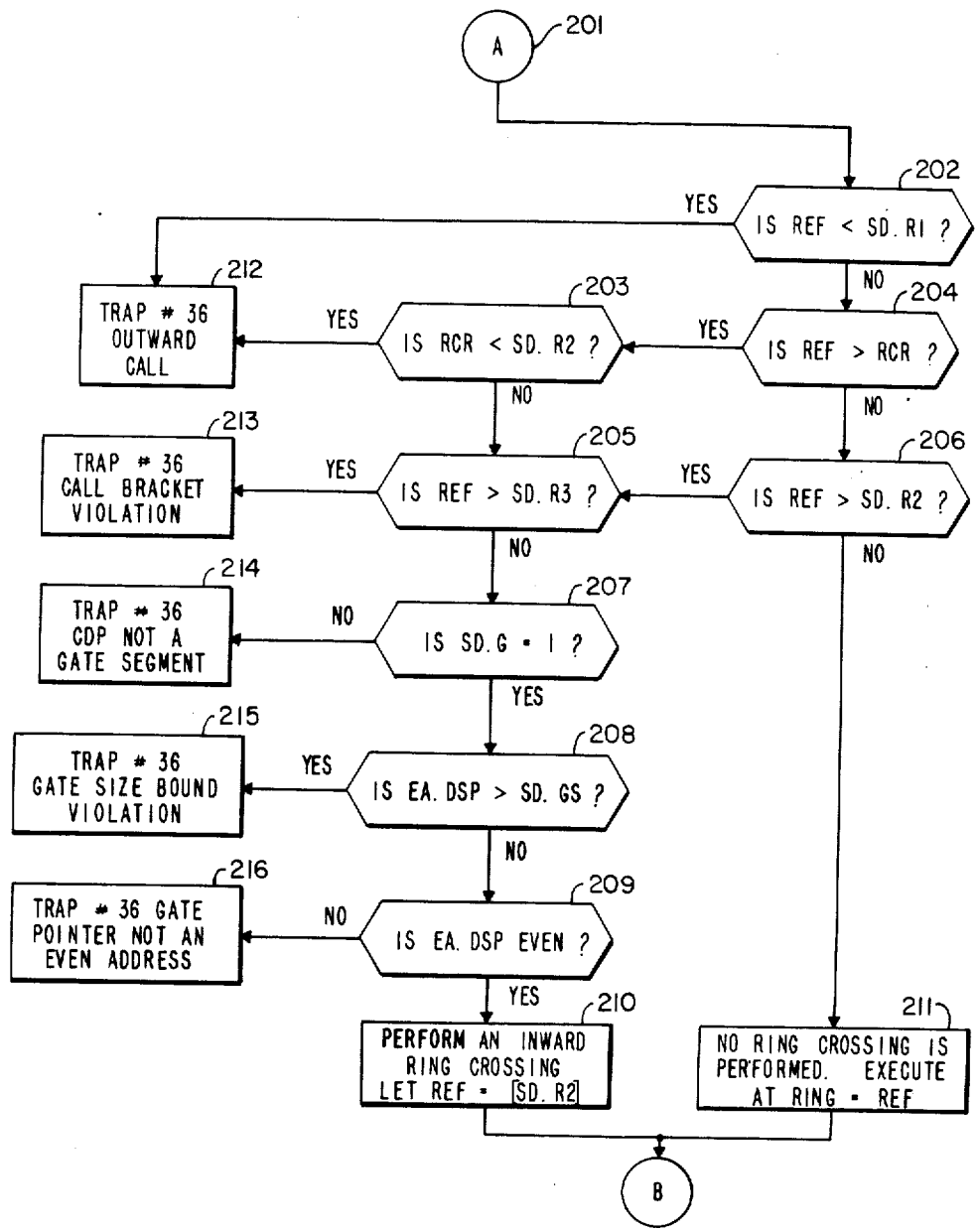

Referring now to FIG. 9 there is shown a flowchart that shows the checks that must be performed to determine if a call is indeed possible. Three possibilities can occur. One the call is successful and no ring change takes place. Two the call is successful and a ring change takes place. Three the call is not allowed. If the called and calling procedures are peer procedures; i.e., have the same execute privilege, then the call will not be successful and no ring change takes place. This path is shown by steps 202, 204, 206 and 211. The tests performed in steps 202 and 206, in this case, basically state that SD.R1≦REF≦SD.R2 or that REF is within the execute bracket of the called procedure.

If the called procedure has greater privilege than the calling procedure, then the call will be successful only if certain conditions are met. If all these conditions are met, then the call will be successful and a ring change takes place. This path is shown by steps 202, 204, 206, 205, 207, 208, 209 and 210. If the call is not successful, then the path through steps 202, 204, 206 and 205 will terminate at any of the following steps, 213, 214, 215, or 216. The tests performed in steps 202 and 206, in this case, basically state that SD.R2<REF or that REF is not within the execute bracket of the called procedure and that the following conditions must be met to successfully complete the call.

Step 205 determines whether or not the calling procedure is outside the call bracket of the called procedure. (The call bracket is the range of ring numbers in which a calling procedure must be executing in order to make a call to a given segment.

If the calling procedure is outside the call bracket of the called procedure, then a trap 213 is envoked. If it is not, then the next step 207 is entered. In step 207 there is a check make to determine if the called procedure is a gate procedure. (A gate procedure is a procedure which may be entered via a call through a gate. This is required when a calling procedure is within the call bracket of a called procedure, but not within its execute bracket; i.e., when an inward ring cross must be made to effect the call.)

Since in this instant a ring crossing is necessary, (i.e., the ring numbers of the calling and called procedures are not equal) the called procedure must be in a gate segment. Accordingly in step 207 a check is made to determine if the gate bit of the segment descriptor is a 1. If it is a 1, then step 208 is entered. If it is not a 1, a trap 214 is taken which indicates that the called procedure is not in a gate segment. In step 208 a check is made to determine that the displacement of the Effective Address is within the gate array. (A gate array enumerates the entry points of the procedure segment in order to insure that control is not transferred to the procedure via an inward ring crossing call at a location other than at one of the entry points.)

If the answer to this test is yes, then there is a gate size violation and a trap 215 is entered. If the answer is no, indicating we are within the gate array, then step 209 is entered. In step 209 a check is performed to determine that the effective address EA is an even address to insure that we are pointing to the first word or a pointer which points to the called procedure. If the answer to this test is no, a trap 216 is entered. If, on the other hand the answer is yes, an inward ring crossing is performed as shown on step 210.

If the called procedure is less privileged than the calling procedure, then the call is not allowed as this would result in an outward call attempt. This path is shown by steps 202 and 212. The test performed in step 202, in this case, basically states that REF<SD.R1 or that REF is more privileged than the execute bracket of the called procedure.

If privilege was lost during the computation of REF. in step 101 of FIG. 8, then the path shown by steps 202, 204 and 203 must be taken to protect against an outward call attempt. The test performed in step 204, in this case, states that privilege was lost during the computation of REF since REF is less privileged than RCR. Thus the test performed in step 203 is required to insure that the original (RCR) privilege of the calling procedure is not more privileged than the lowest privilege of the called procedure (SD.R2). If the answer to test 203 is Yes, then an outward call is being attempted and a trap 212 is entered. If the answer to test 203 is No, then proceed as if the called procedure has greater privilege than the calling procedure via steps 205, 207, 208, 209 and 210.

Figure 10:
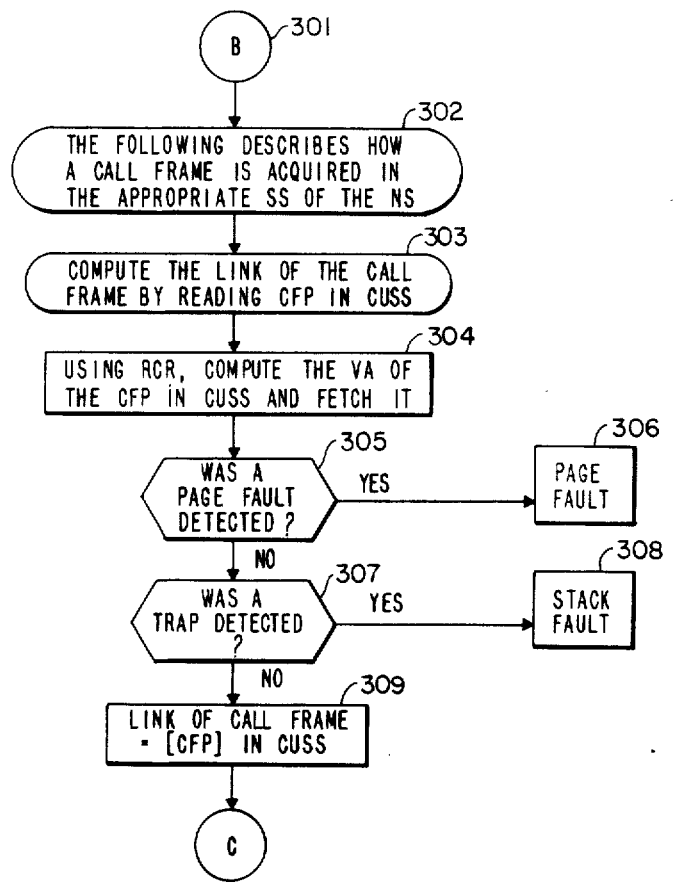

Referring now to FIG. 10 there is shown a flowchart wherein a call frame is acquired in the appropriate stack segment (SS) of a new stack mechanism (NS) see step 302. First compute the value of the link to be stored in the call frame by reading the current frame pointer (CFP) in the current stack segment (CUSS). See step 303 and also FIG. 2. In step 304 the current ring number RCR is used to compute the virtual address VA of the current stack segment CUSS. The CUSS contains the current frame which belongs to the calling procedure CGP. The header of the CUSS contains the current frame pointer CFP. The CFP is the value of the link to be stored in the call frame. See step 309 and FIG. 2. Steps 305 and 307 determine whether or not a page fault or trap was detected.

Figure 11:
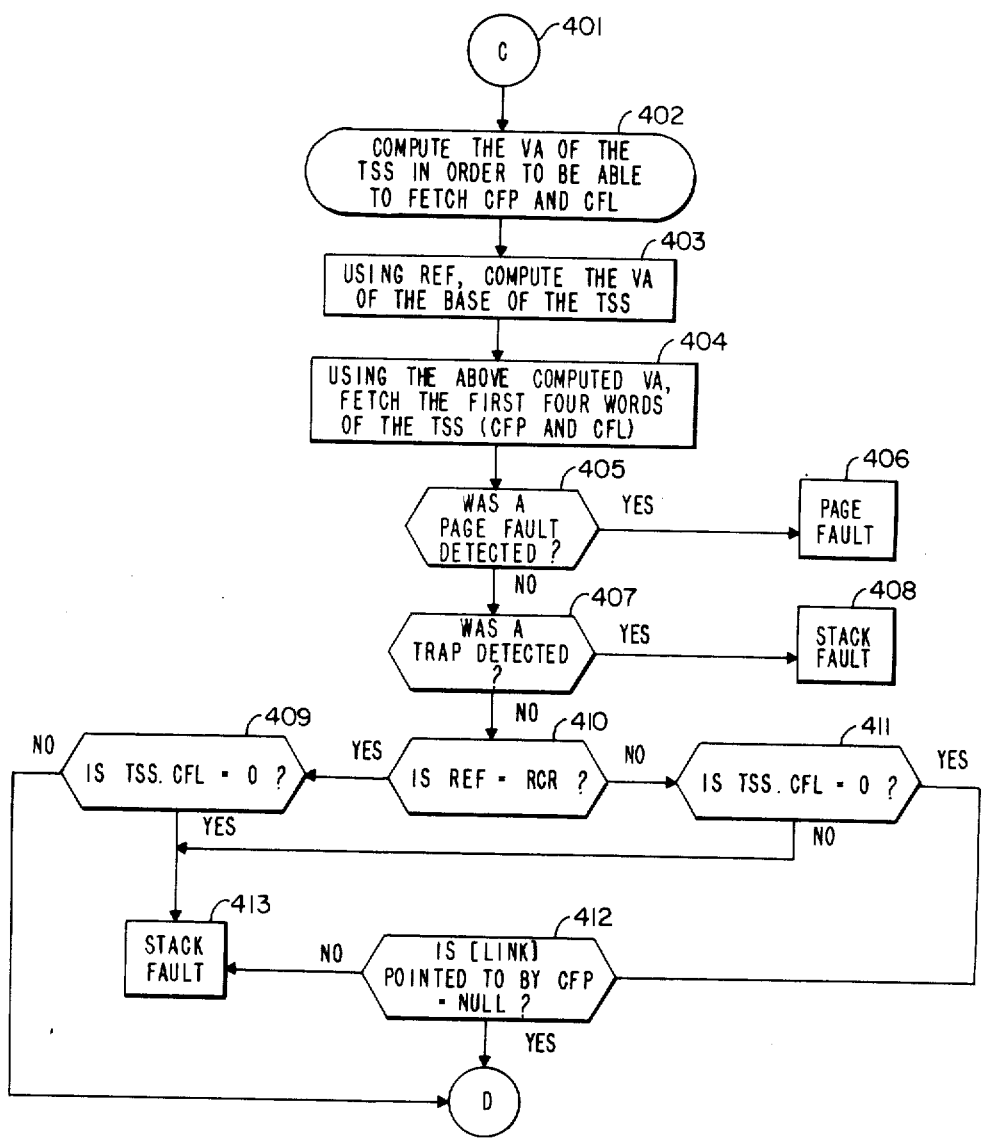

Referring now to FIG. 11 the flowchart shows how to compute the location where the call frame is stored. Depending on whether or not a ring change occurs, a new call frame will either be appended to the current stack segment or to an inner ring stack segment if the ring crossing takes place. Step 402, the virtual address VA of the target stack segment TSS is computed in order to be able to fetch its current frame pointer CFP and the current frame length CFL. See also FIG. 2. In step 403 the R effective REF is utilized to find out where the target stack segment is. The first four words of the target stack segment containing the current frame pointer and the current frame length is read in step 404. These are utilized to compute the address of a new frame. In steps 405 and 407 a check is made for page faults and traps to insure that the operation can be successfully completed.

In step 410 it is determined whether a ring change has been performed or not. If R effective REF and R current RCR are equal, then the new call frame is being placed in the same stack segment which is the current stack segment and checks are performed to insure the integrity of the stack shown in step 409. (Integrity means that everything is as it should be; i.e., consistent state.) The stack's integrity is insured if the current frame length CFL stored in the header of the stack segment is not equal to 0. If, on the other hand, REF is not equal to RCR as determined in step 410, there is an indication that an inward ring change is necessary and two different stack segments are involved—the current stack segment and the target stack segment. This case indicates that since we would be going from an outer ring to an inner ring, the target stack segment cannot possibly contain a stack frame at this time. Accordingly its current frame length must equal 0, as shown in box 411. If it does equal 0, then step 412 is entered where a final check on the integrity of the stack is made. Accordingly, a new frame is placed in the target stack segment. The format of this target stack segment requires that the LINK pointed to by the current pointer be null.

Figure 12:
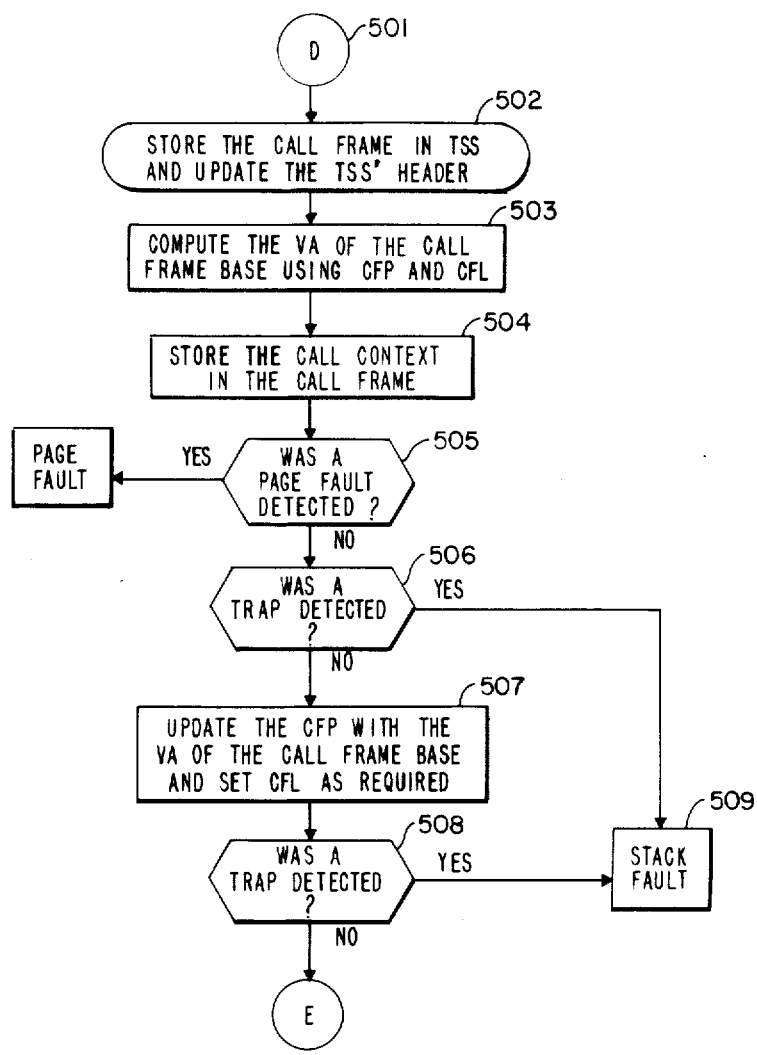

Referring now to FIG. 12 the call frame is stored in the target stack segment and the target stack segment's header is updated. In step 503 the virtual address or the called frame is computed using the current frame pointer CFP and the current frame length CFL. The call context is stored in the call frame in step 504. (A call context is information that indicates the state of a procedure when it was entered and is used to allow that procedure to access arguments passed to it and restore as necessary the processor state upon return to the caller.)

Then in steps 505 and 506 a check is made to determine whether a page fault or trap was detected. Once this has been performed, the current frame pointer is updated with the virtual address of the call frame base and the current frame length CFL is set as required in step 507. In step 508 it is determined whether or not a trap was detected. If there was a stack fault, step 509, results otherwise the next step E is entered.

Figure 13:
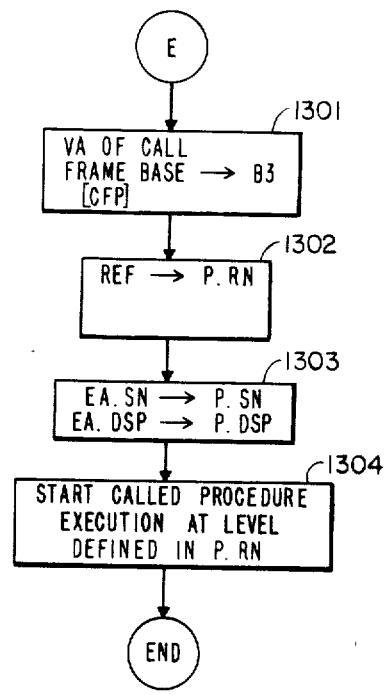

Referring now to FIG. 13 the virtual address VA of the call frame base is stored in register B3 (not shown) in step 1301. The R effective REF is then loaded into a procedure ring number counter (not shown). See step 1302. In step 1303 the effective address EA (EA.SN and EA.DSP) is loaded into a procedure pointer register P (not shown). Finally in step 1304 the call procedure execution is started.

Having shown and described a preferred embodiment of the invention, those skilled in the art will realize that many variations or modifications may be made to produce the described invention and still be within the spirit and scope of the claimed invention.

We claim:

1. A memory stack arrangement used in a multiprocessing/multiprogramming computer system having a ring architecture comprised of at least four rings numbered 0–3 with the innermost ring being assigned an identity of 0 and the outermost ring being assigned an identity of 3, and with the innermost ring being the highest level of privilege, a plurality of processors for executing procedures thereon, a software operating system for supervising/scheduling the execution of the procedures, each procedure and the software operating system having a predetermined level of privilege, each of said procedures for executing at its predetermined level of privilege, said memory stack arrangement being organized to implement an operation with said ring architecture wherein a procedure executing at a lower level of privilege can execute at a higher level of privilege, said memory stack arrangement comprising:

a wired memory stack segment assigned to the highest priority one of said rings wherein the operating system cannot tolerate page faults;

a plurality of non-wired memory stack segments, one of said non-wired stack segments being assigned to each of said rings; and wherein each of said wired and non-wired memory stack segments store the ring number of the ring to which they are assigned, a request from a higher priority ring to a lower priority ring to process a procedure request is always granted and requests from lower priority rings to higher priority rings are normally blocked, but under special conditions a request from a lower priority ring to a higher priority ring is granted.

2. In a multiprocessing/multiprogramming computer system having a ring architecture comprised of at least four rings numbered 0–3 with the innermost ring being assigned an identity of 0, and the outermost ring being assigned an identity of 3, and with the innermost ring being the highest level of privilege, a plurality of processors for executing procedures thereon, firmware instruction and software instruction, a software operating system for supervising/scheduling the execution of the procedures, each procedure and the software operating system having a predetermined level of privilege, each of said procedures for executing at its predetermined level of privilege, a method for permitting a procedure executing at a lower level of privilege to execute at a higher level of privilege (i.e., inward call to a lower ring number) comprising:

assigning a wired memory stack segment to the highest priority ring wherein the operating system cannot tolerate page faults;

assigning a non-wired memory stack segment to each of said rings; and checking information stored in each of said wired and non-wired memory stack segments indicating the ring to which they are assigned when a request is being made to process a procedure request in a different ring and always granting a request from a higher priority ring to a lower priority ring to process a procedure request, and normally each request from lower priority rings to higher priority rings are blocked unless special conditions are met.

\* \* \* \* \*